US008101315B2

(12) United States Patent
Gronwald et al.

(10) Patent No.: US 8,101,315 B2
(45) Date of Patent: Jan. 24, 2012

(54) HYBRID MEMBRANES, METHOD FOR PRODUCTION OF HYBRID MEMBRANES AND FUEL CELLS USING SUCH HYBRID MEMBRANES

(75) Inventors: Oliver Gronwald, Gottingen (DE); Dieter Melzner, Gottingen (DE); Ulrich Mahr, Berlin (DE); Annette Reiche, Gottingen (DE)

(73) Assignee: Elcomax Membranes GmbH, Munich (DE)

( * ) Notice: Subject to any disclaimer, the term of this patent is extended or adjusted under 35 U.S.C. 154(b) by 0 days.

(21) Appl. No.: 12/206,111

(22) Filed: Sep. 8, 2008

(65) Prior Publication Data

US 2009/0075141 A1 Mar. 19, 2009

Related U.S. Application Data

(63) Continuation of application No. PCT/EP2007/001434, filed on Feb. 20, 2007.

(30) Foreign Application Priority Data

Mar. 8, 2006 (DE) .......................... 10 2006 010 705

(51) Int. Cl.
*H01M 8/10* (2006.01)
*C09D 183/10* (2006.01)
(52) U.S. Cl. ........................... 429/491; 429/492; 521/27
(58) Field of Classification Search .......... 429/491–493; 521/27
See application file for complete search history.

(56) References Cited

U.S. PATENT DOCUMENTS

| 5,525,426 | A | 6/1996 | Kulzick et al. |
| 6,790,553 | B1 | 9/2004 | Yamamoto |
| 6,946,211 | B1 | 9/2005 | Bjerrum et al. |
| 2004/0171781 | A1* | 9/2004 | Gan et al. ...................... 526/319 |
| 2005/0053822 | A1* | 3/2005 | Miyake et al. .................. 429/33 |
| 2005/0118476 | A1 | 6/2005 | Melzner et al. |
| 2006/0004182 | A1* | 1/2006 | Dawkins et al. .............. 528/327 |
| 2006/0199062 | A1* | 9/2006 | Yanagita et al. ................ 429/33 |
| 2007/0003808 | A1* | 1/2007 | Melzner et al. ................ 429/33 |

FOREIGN PATENT DOCUMENTS

| DE | 10155543 | 5/2003 |
| DE | 10301810 | 7/2004 |
| WO | 00/44816 | 8/2000 |
| WO | 01/18894 | 3/2001 |
| WO | WO 2005076401 A1 * | 8/2005 |
| WO | 2005/111114 | 11/2005 |

OTHER PUBLICATIONS

Gultek et al. "Preparation and characterization of polybenzimidazole-clay hybrid materials", Materials Science and Engineering B107 (2004), pp. 166-171.*
International Search Report for corresponding PCT Application No. PCT/EP2007/001434 dated May 11, 2007.
Yano, et al. "Physical Properties and Structure of Organic-inorganic Hybrid Materials Produced by Sol-Gel Process" Materials Science and Engineering C, Elsevier Science S.A, CH, vol. 6 No. 2-3, Nov. 1998, pp. 75-90.
Staiti P., et al., "Membranes Based on Phosphotungstic Acid and Polybenzimadazole for Fuel Cell Application", Journal of Power Sources, Elsevier, Amsterdam, NL, vol. 90, 2000, pp. 231-235.
English Translation of the International Preliminary Report on Patentability, with attached English translation of the Written Opinion of the International Searching Authority for the corresponding International Application No. PCT/EP2007/001434; date of issuance Oct. 14, 2008.
Loy, et al. "Bridged Polysilsesquioxanes. Highly Porous Hybrid Organic-Inorganic Materials", Chem Rev. 1995, 95, 1431-1442.
P.Gomez-Romero, et al. "Hybrid proton-conducting membranes for polymer electrolyte fuel cells Phosphomolybdic acid doped poly(2,5-benzimidazole)-(ABPBI-H3PM12O40)", Electrochimica Acta 50 (2005) 4715-4720.
Bentonite, Article from Wikipedia, online encyclopedia, downloaded on Apr. 4, 2011, (http://en.wikipedia.org/wiki/Bentonite).
Hydrogen Bond, Article from Wikipedia, online encyclopedia, downloaded on Mar. 29, 2011, (http://en.wikipedia.org/wiki/Hydrogen_bond).
Montmorillonite, Article from Wikipedia, online encyclopedia, downloaded on Mar. 29, 2011, (http://en.wikipedia.org/wiki/Montmorillonite).
Reprint of "A Silane Primer: Chemistry and Applications of Alkoxy Silanes," The Journal of Coatings Technology, vol. 65, No. 822, pp. 57-60 (Jul. 1993).
Silicate Minerals, Article from Wikipedia, online encyclopedia, downloaded on Mar. 29, 2011, (http://en.wikipedia.org/wiki/Silicate_minerals).

\* cited by examiner

*Primary Examiner* — Gregg Cantelmo
(74) *Attorney, Agent, or Firm* — Myers Wolin, LLC

(57) ABSTRACT

The invention relates to hybrid membranes that are composed of an organic polymer and an inorganic polymer, a method for producing hybrid membranes, and the use of said hybrid membranes in polymer electrolyte membrane fuel cells. The inventive hybrid membranes comprise at least one alkaline organic polymer and at least one inorganic polymer. Said polymers are blended together at a molecular level. The inorganic polymer is formed from at least one precursor monomer when the membrane is produced. The disclosed membranes are characterized in that the same are provided with high absorptivity for doping agents, have a high degree of mechanical and thermal stability in both an undoped and doped state, and feature permanently high proton conductivity.

19 Claims, 2 Drawing Sheets

Figure 1:
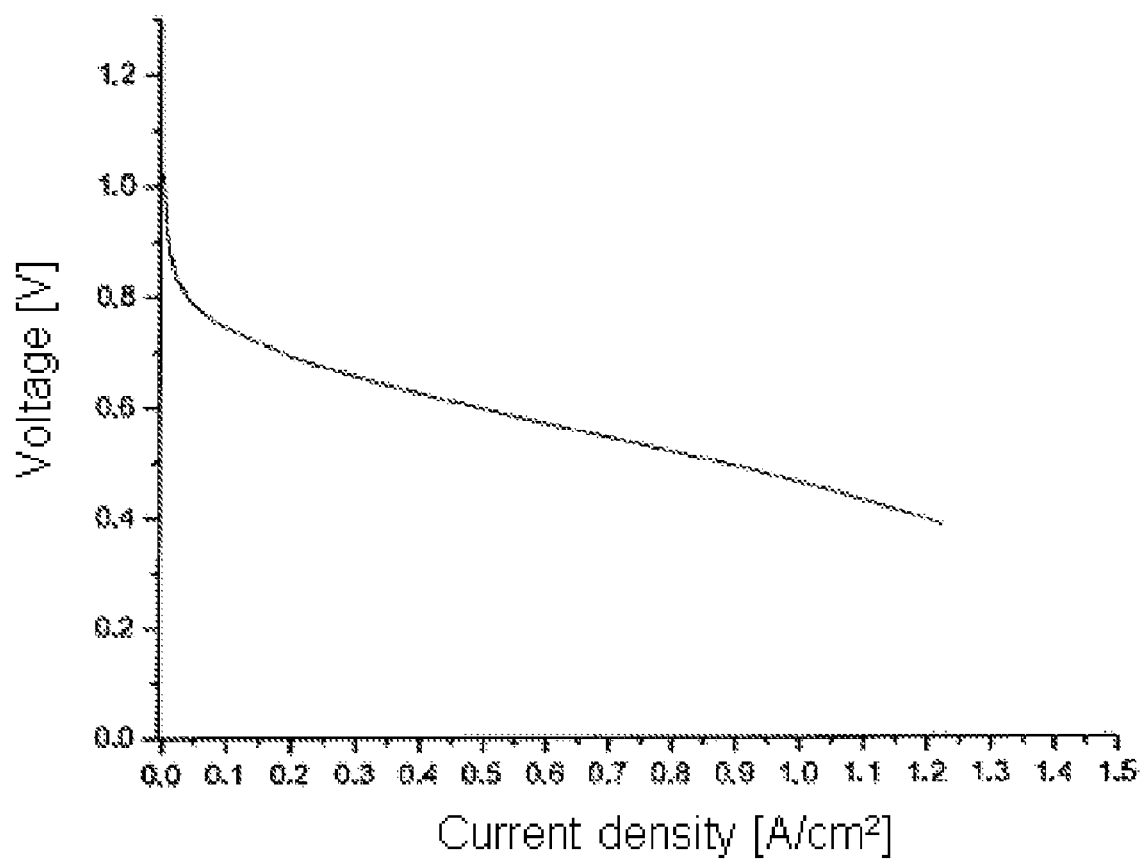

HYBRID MEMBRANES, METHOD FOR PRODUCTION OF HYBRID MEMBRANES AND FUEL CELLS USING SUCH HYBRID MEMBRANES

CROSS-REFERENCE TO RELATED APPLICATIONS

This application is a continuation of PCT/EP2007/001434, filed Feb. 20, 2007, which claims priority to German Application No. 10 2006 010 705.5 filed on Mar. 8, 2006, the contents of each application are incorporated herein by reference.

FIELD OF THE INVENTION

The present invention relates to hybrid membranes composed of an organic polymer and of an inorganic polymer, to a method for production of hybrid membranes and to the use of these hybrid membranes in polymer electrolyte membrane fuel cells.

BACKGROUND

Polymer electrolyte membranes based on polybenzimidazole (PBI) are known for use in high-temperature fuel cells (U.S. Pat. No. 5,525,436, WO 200118894 A2, DE 103 01 810 A1, DE 101 55 543 C2 and M. Rikukawa, K. Sanui, Prog. Polym. Sci. 2000, 1463-1502). After being doped with phosphoric acid, the basic polymer forms a proton-conducting phase, in which proton transport does not depend on the presence of water, thus permitting operation of these fuel cells in the temperature range up to 200° C. The doping process does not impair the high thermal stability of PBI, although it does reduce the mechanical stability. It is therefore common practice to cross-link the polybenzimidazole by covalent bonds. As cross-linking reagents there are used bifunctional hydrocarbon-based compounds containing epoxide or isocyanate groups (WO 200044816 A1, U.S. Pat. No. 6,790,553 B1, DE 103 01 810 A), which cross-link the polymer chains with one another by means of reaction with the NH groups of the polybenzimidazole. However, the chemical and thermal stability of the cross-linking points, especially the stability of the cross-linking organic groups to oxidizing agents at higher temperatures, is limited. Such aliphatic cross-linking chains do not contribute in any way to proton conductivity. Because of restricted mobility of the overall system and also because of limited ability of the cross-linked polymer to absorb the doping agent that imparts proton conductivity, the conductivity of the membranes can be additionally restricted, if PBI is cross-linked via diepoxides or diisocyanates.

The stability of an organic polymer matrix can be improved by incorporation of silicate reinforcing material. From the prior art there are known, for example, hybrid membranes, composed respectively of hydroxypropylcellulose (HPC), polyvinyl alcohol (PVA) and polyvinylidene fluoride (PVDF) and silicate material. These hybrid membranes are produced by mixing the polymer with alkoxy-substituted silanes, such as tetraethoxysilane (TEOS), the inorganic material being deposited in the organic polymer matrix by means of an acid-catalyzed sol-gel process. The interaction between organic and inorganic phase can be mediated by hydrogen-bridge bonds, and the mechanical stability of these hybrid materials increases with increasing content of silicate material (S. Yano, Materials Science and Engineering C6 (1998), 75-90). For the inorganic phase, however, the attainable degree of condensation by acid-catalyzed condensation is only 65 to 75%, whereas degrees of condensation of 80 to 90% are attained under base catalysis (D. A. Loy, K. J. Shea, Chem. Rev. 1995, 95, 1431-1442). If basic polymers constitute the polymer matrix, acid-catalyzed sol-gel condensation is unsuitable as a method, since the salt formation occurring due to acid-base interactions makes the polymer insoluble in organic solvents. For a polybenzimidazole matrix, the incorporation of organically modified $Na^+$ bentonite is known in the literature, the resulting bentonite-PBI nanocomposite having elevated thermal stability compared with unmodified PBI (T. Seckin, Materials Science and Engineering B 107 (2004) 166-171). It is known that phosphotungstic acid immobilized on silica can be incorporated as a filler in a polybenzimidazole matrix for use as a polymer electrolyte in fuel cells (P. Staiti, M. Minutoli, S. Hocevar, J. Power Sources 90 (2000) 231-235). Such membranes are produced by addition of a mixture of silica and phosphotungstic acid to a solution of polybenzimidazole in N,N-dimethylacetamide. They have low proton conductivity above 110° C. For AB-PBI as a polybenzimidazole modification, an improvement of conductivity in the condition doped with phosphoric acid was achieved by direct incorporation of phosphomolybdic acid (P. Gomez-Romereo, J. A. Asensio, S. Borros, Electrochimica Acta 50 (2005), 4715-4720). In this case, the heteropoly acid was dissolved in a solution of AB-PBI in methanesulfonic acid before the membrane production process, and homogeneous casting solutions were obtained.

SUMMARY

The object of the invention is therefore to provide membranes that exhibit high mechanical and thermal stability in both undoped and doped forms, that have high binding strength for doping agents and that in the doped form have durably high proton conductivity, and to propose a method for production of such membranes and of fuel cells using such membranes.

The objects are achieved by the subject matters defined in the claims.

The inventive hybrid membranes are composed of at least one basic organic polymer and at least one inorganic polymer. These polymers are intimately mixed at the molecular level. The inorganic polymer is formed from at least one precursor monomer during membrane formation. By an inorganic polymer there is to be understood a polymer in which at least one kind of atoms A of main and subgroups elements are linked to one another at least in pairs via the repeat unit $(-A-O-)_x$. In this connection, atoms A may be linked both to atoms of the same element and to atoms of other elements via the repeat unit $(-A-O-)_x$. Within the meaning of the invention, "intimately mixed at the molecular level" means that oligomeric and polymeric structures containing an arbitrary number x of the repeat unit $(-A-O-)_x$ interpenetrate the chains or networks of the organic polymer in chain, banded, star or layered structure. For A=Si, a silicon atom of the repeat unit $(-A-O-)_x$ is then a constituent of at least one further such unit.

An interaction takes place between the polymers of the inventive hybrid membranes. The interaction has the form of van der Waals and/or adsorptive forces and/or ionic and/or covalent bonds.

As a result, the inventive hybrid membranes have high thermal and mechanical stability. On the basis of their elevated mechanical stability, the inventive hybrid membranes have a modulus of elasticity of at least 5000 $N/mm^2$, and they withstand tensile stresses up to at least 150 $N/mm^2$ at room temperature.

In a preferred configuration of the invention, the at least one organic polymer is a basic polymer selected from the group comprising polybenzimidazoles, polypyridines, polypyrimidines, polyimidazoles, polybenzthiazoles, polybenzoxazoles, polyoxadiazoles, polyquinoxalines, polythiadiazoles and/or poly(tetrazapyrenes). Preferred are poly(2,2'-(m-phenylene)-5,5'-dibenzimidazole) and/or poly-2,5-benzimidazole.

In a particularly preferred embodiment of the invention, a 1 weight percent solution of poly(2,2'-(m-phenylene)-5,5'-dibenzimidazole) in N,N-dimethylacetamide has an inherent viscosity of at least 0.85 dl/g.

In a further particularly preferred embodiment, a 1 weight percent solution of poly-2,5-benzimidazole in ethanol containing 3 wt % of sodium hydroxide has an inherent viscosity of at least 1.5 dl/g.

The at least one inorganic polymer of the inventive hybrid membranes constitutes reinforcement for the at least one organic polymer. Reinforcement means that the hybrid membrane has higher long-term mechanical and thermal stability because of the inorganic polymer and, after being doped, has higher proton conductivity than does a comparison membrane composed only of at least one organic polymer.

In a preferred form, the inorganic polymer is composed of repeat units $(-A-O-)_x$, in which A=W, Si, Sb, P, Ta, Nb, Ti, S, As, Bi, Se, Ge, Sn, Pb, B, Al, Cr. Zr and/or Mo with the different kinds of atoms in variable sequence, and in which A may have further substituents. In a particularly preferred embodiment of the invention, the inorganic polymer of the hybrid membrane is composed of a silicate polymer in which A is exclusively Si.

Among precursor monomers for the inorganic polymer, there are to be understood the following groups of compounds with the general formula:

$R_xSi(OR)_{4-x}$, where x=0 to 3, R=C1-C15 alkyl group, C5-C20 aryl or heteroaryl group and/or $(X-R^1)_x(Si(OR^2)_{4-x}$, where x=1 to 3, $R^1=-(CH_2)_y-$ with y=1 to 5, $-CH_2O(CH_2)_y-$ with y=1 to 5, C5-C20 aryl or heteroaryl group, $R^2$=C1-C15 alkyl group or C5-C20 aryl or heteroaryl group, X=hydroxyl, amino, epoxy, isocyanato, anhydrido, methacryloxy, vinyl or $-CO_2Z$, $-PO_3Z_2$, $-SO_3Z$ with Z=hydrogen, alkali metal cation (Li, Na, K, Cs), C1-C15 alkyl group, C1-C15 alkoxy group, C5-C20 aryl or heteroaryl group, $SiR^3{}_3$ with $R^3$=C1-C15 alkyl group, C5-C20 aryl or heteroaryl group, C1-C15 alkoxy group or ethyleneoxy group, in which the foregoing Z and/or $R^3$ groups are substituted with halogen, OH, CN groups and/or $(Het(C=O)-N(R^6)-R^5)_xSi(OR^4)_{4-x}$, where x=1 to 3, $R^4$=C1-C15 alkyl group or C5-C20 aryl or heteroaryl group, $R^5=-(CH_2)_y$ with y=1 to 5 and C5-C20 aryl or heteroaryl group, $R^6$=hydrogen, C1-C15 alkyl group or C5-C20 aryl group and Het=heteroaryl group with preferably nitrogen-containing aromatic heterocycles in the ring.

A common structural feature of these $R_xSi(OR)_{4-x}$, $(X-R^1)_x(Si(OR^2)_{4-x}$ or $(Het(C=O)-N(R^6)-R^5)_xSi(OR^4)_{4-x}$ precursor monomers from the group of silanes is at least one condensable or hydrolysable alkoxy or aryloxy substituent OR, $OR^2$ or $OR^4$ that yields the $(-Si-O-)_x-$ repeat units of the inorganic polymer when it is cleaved off.

Preferred silanes of the $R_xSi(OR)_{4-x}$ group are dimethoxy-dimethylsilane, diethoxydimethylsilane, ethyltrimethoxysilane, tetraethoxysilane and tetramethoxysilane.

From the group of $(Het(C=O)-N(R^6)-R^5)_xSi(OR^4)_{4-x}$ precursor monomers there are particularly preferred, according to the following formula:

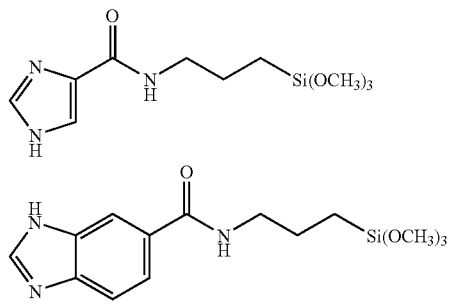

N-(3-trimethoxysilylpropyl)-benzimidazol-5-carboxylic acid amide and N-(3-trimethoxy-silylpropyl)-imidazol-4-carboxylic acid amide The preferred silanes of the $(X-R^1)_x(Si(OR^2)_{4-x}$ group include aminophenyltrimethoxysilane, 3-aminopropyltriethoxysilane, 3-isocyanatopropyl-trimethoxysilane and particularly preferably (3-glycidoxypropyl)trimethoxysilane as well as diethylphosphatoethyltriethoxysilane. The epoxy, isocyanato, anhydrido or methacryloxy function X of the $X-R^1$ substituents of the aforesaid $(X-R^1)_x(Si(OR^2)_{4-x}$ silanes permits covalent bonding of the precursor monomer to the NH function of the polyazole polymers, as illustrated by the example in the following formula:

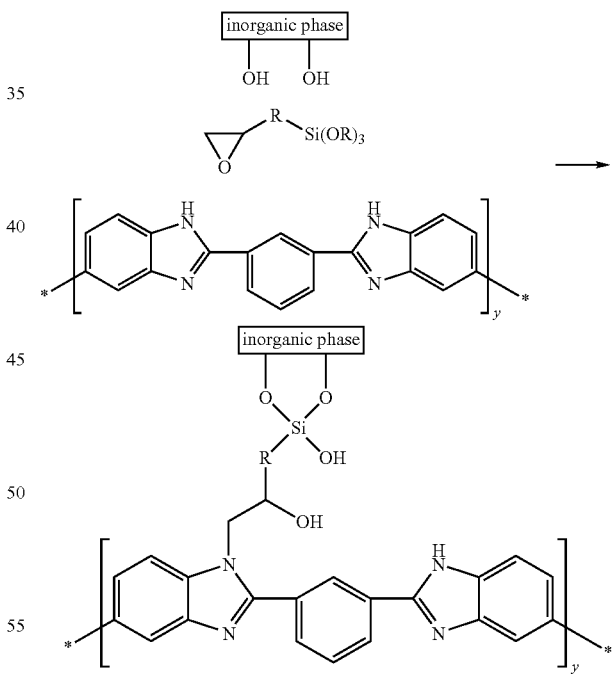

Hereby the mechanical and thermal stability of the inventive hybrid membranes is increased by covalent bonds between the at least one organic and the at least one inorganic polymer. This covalent linking occurs in addition to the hydrogen bridges between Si—OH functions of the inorganic polymer and the NH functions of the preferred polybenzimidazole.

Also understood as precursor monomers for the at least one inorganic polymer are alkoxy and aryloxy derivatives of the main and subgroup elements, preferably $M(OR)_y$ (y=3 to 4, M=inorganic central atom such as B, Al, Ti, Zr, R=C1-C15 alkyl group or C5-C20 aryl or heteroaryl group) and/or alkyl and aryl derivatives of polybasic oxo acids $R_nXO_m$ (n>1, m>2 with m>n, X=P, S, Se, Mo, W, As, Bi, Ge, Sn, Pb, Cr; R=H, C1-C15 alkyl group or C5-C20 aryl or heteroaryl group or $SiR^1_3$ with $R^1$=C1-C15 alkyl group or C5-C20 aryl or heteroaryl group). As in the silicate monomers, the OR groups are capable of condensation here.

Particularly preferred as precursor monomers of the $M(OR)_y$ group are boric acid triphenyl esters, boric acid triethyl esters, titanium(IV) ethylate, zirconium(IV) ethylate, aluminum triethylate. Particularly preferred in the $R_nXO_m$ group are phosphoric acid tris-(trimethylsilyl esters)phosphoric acid tris-(triethylsilyl esters), bis(2-ethylhexyl)phosphate, diphenyl phosphate, phosphoric acid tritolyl esters and triphenyl phosphate.

Furthermore, in a preferred embodiment, the inventive hybrid membranes contain at least one additive selected from the following substance classes:

oxo acid derivatives of the main and subgroup elements with tungsten, silicon, antimony, phosphorus, tantalum, niobium, titanium, sulfur, arsenic, bismuth, selenium, germanium, tin, lead, boron, chromium and/or molybdenum as the central atom, preferably $H_3PW_{12}O_{40} \times nH_2O$ (n=21 to 29), $H_3SiW_{12}O_{40} \times nH_2O$ (n=21 to 29), $H_xWO_3$ (x=0.3 to 1), $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ and/or $M_xO_y$ oxides with x=1 to 2 and y=2 to 5, preferably M=Al, Sb, Th, Sn, Zr, Mo and/or layered, banded and/or skeletal silicates, preferably zeolites, H-natrolites, H-mordenites, H-montmorillonites, ammonium analcines, ammonium sodalites, ammonium gallates. The proportion of the additive in the inventive hybrid membrane is 1 to 20% relative to the organic polymer.

The addition of at least one of these additives further increases the mechanical stability of the inventive membrane in the high-temperature region.

The solubility of the inventive hybrid membranes in N,N-dimethylacetamide is at most 30 wt %, whereas PBI comparison membranes have a higher degree of solubility of at least 55 wt %.

The inventive hybrid membranes may already be inherently proton-conducting, but this proton conductivity is greatly increased by the absorption of doping agent. Unexpectedly, it has been found that the hybrid membranes doped according to the invention have much higher proton conductivity than corresponding membranes that lack the inorganic polymers and lack the additives. Since the additives increase the proton conductivity by incorporation of defect sites, it is possible, for example, to lower the degree of doping of the hybrid membranes without sacrificing efficiency of the fuel cells manufactured therefrom. The fixed doping agent is preferably phosphoric acid. Surprisingly, the inventive hybrid membranes fix the doping agent durably, resulting in high long-term stability in fuel-cell operation.

The inventive method for production of a hybrid membrane comprises the following steps:

A) Forming a membrane casting solution of at least one basic organic polymer, a precursor monomer for an inorganic polymer, a basic catalyst and solvent into the form of a membrane, B) Removing solvent and volatile condensation products from the membrane form at temperatures of 50 to 150° C., until a self-supporting polymer membrane is obtained, C) Heat-treating the polymer membrane obtained in step B) at temperatures in the range of 150 to 400° C. for a period ranging from one minute to 5 hours.

For the at least one basic organic polymer employed in step A) there is preferably used a polymer selected from the group comprising polybenzimidazoles, polypyridines, polypyrimidines, polyimidazoles, polybenzthiazoles, polybenzoxazoles, polyoxadiazoles, polyquinoxalines, polythiadiazoles and/or poly(tetrazapyrenes). Particularly preferably, at least one organic polymer from the group of polybenzimidazoles, preferably poly(2,2'-(m-phenylene)-5,5'-dibenzimidazole) and/or poly-2,5-benzimidazole, is used in step A).

In a further preferred embodiment, the at least one precursor monomer from which the inorganic polymer is generated in step A) is obtained from the group of compounds with the general formula:

$R_xSi(OR)_{4-x}$, where x=0 to 3, R=C1-C15 alkyl group, C5-C20 aryl or heteroaryl group and/or $(X-R^1)_x(Si(OR^2)_{4-x}$, where x=1 to 3, $R^1$=—$(CH_2)_y$— with y=1 to 5, —$CH_2O$ $(CH_2)_y$— with y=1 to 5, C5-C20 aryl or heteroaryl group, $R^2$=C1-C15 alkyl group or C5-C20 aryl or heteroaryl group, X=hydroxyl, amino, epoxy, isocyanato, anhydrido, methacryloxy, vinyl or —$CO_2Z$, —$PO_3Z_2$, —$SO_3Z$ with Z=hydrogen, alkali metal cation (Li, Na, K, Cs), C1-C15 alkyl group, C1-C15 alkoxy group, C5-C20 aryl or heteroaryl group, $SiR^3_3$ with $R^3$=C1-C15 alkyl group, C5-C20 aryl or heteroaryl group, C1-C15 alkoxy group or ethyleneoxy group, in which the foregoing Z and/or $R^3$ groups are substituted with halogen, OH, CN groups and/or (Het(C=O)—N $(R^6)$—$R^5)_xSi(OR^4)_{4-x}$, where x=1 to 3, $R^4$=C1-C15 alkyl group or C5-C20 aryl or heteroaryl group, $R^5$=—$(CH_2)_y$ with y=1 to 5 and C5-C20 aryl or heteroaryl group, $R^6$=hydrogen, C1-C15 alkyl group or C5-C20 aryl group and Het=heteroaryl group with preferably nitrogen-containing aromatic heterocycles in the ring.

As preferred silanes of the $R_xSi(OR)_{4-x}$ group, there are used dimethoxydimethylsilane, diethoxydimethylsilane, ethyltrimethoxysilane, tetraethoxysilane and tetramethoxysilane in step A) of the inventive method.

As the preferred silanes of the $(X-R^1)_x(Si(OR^2)_{4-x}$ group there are processed, in step A), aminophenyltrimethoxysilane, 3-aminopropyltriethoxysilane, 3-isocyanatopropyltrimethoxysilane and particularly preferably (3-glycidoxypropyl)trimethoxysilane as well as diethylphosphatoethyltriethoxysilane.

From the (Het(C=O)—N($R^6$)—$R^5)_xSi(OR^4)_{4-x}$ group, there are preferably used N-(3-trimethoxysilylpropyl)-benzimidazol-5-carboxylic acid amide and N-(3-trimethoxysilylpropyl)-imidazol-4-carboxylic acid amide in step A) of the inventive method.

Besides silicate monomers, alkoxy and aryloxy derivatives of the main and subgroup elements, preferably $M(OR)_y$ (y=3 to 4, M=inorganic central atom such as B, Al, Ti, Zr, R=C1-C15 alkyl group or C5-C20 aryl or heteroaryl group) and/or alkyl and aryl derivatives of polybasic oxo acids $R_nXO_m$ (n>1, m>2 with m>n, X=P, S, Se, Mo, W, As, Bi, Ge, Sn, Pb, Cr; R=H, C1-C15 alkyl group or C5-C20 aryl or heteroaryl group or $SiR^1_3$ with $R^1$=C1-C15 alkyl group or C5-C20 aryl or heteroaryl group), are used as precursor monomers for the at least one inorganic polymer in step A) of the inventive method.

Particularly preferably, boric acid triphenyl esters, boric acid triethyl esters, titanium(IV) ethylate, zirconium(IV) ethylate, aluminum triethylate are used as precursor monomers of the $M(OR)_y$ group in step A). In the $R_nXO_m$ group, phosphoric acid tris-(trimethylsilyl esters), phosphoric acid tris-(triethylsilyl esters), bis(2-ethylhexyl)phosphate, diphenyl phosphate, phosphoric acid tritolyl esters and triphenyl phosphate are used particularly preferably in step A) of the inventive method. The precursor monomers are used in step A in a proportion of 2 to 200%, particularly preferably 50 to 100% relative to the organic polymer in the membrane casting solution.

The at least one precursor monomer is added to the membrane casting solution in pure form or as a solution in a polar aprotic solvent, such as N,N-dimethylacetamide.

Surprisingly, the membrane casting solution from step A) of the inventive method is stable for more than 24 hours at room temperature, without the development of condensation. The inorganic polymer with the $(-A-O-)_x-$ repeat unit is formed from the at least one precursor polymer only in step B), above 50° C. The inventive method has high efficiency, because the inorganic polymer is integrated into production of the casting solutions by introduction of its precursor monomers, and is formed in situ in the method. The process temperature range for this purpose is 50 to 150° C., although 65 to 70° C. is preferred.

The condensation process is conducted using a basic catalyst. In an advantageous embodiment of the inventive method, an alkali metal hydroxide of general formula MOH with M=Li, Na, K or Cs is used to initiate the condensation reaction by cleaving off the hydrolysable or condensable substituents of the precursor monomers. Hereby formation of insoluble organic polymer salts is avoided.

Preferably the basic catalyst is used in proportions of 0.2 to 5 wt % relative to the organic polymer, particularly preferably 1 to 3 wt %. The alkali metal hydroxide is dissolved in at least the same amount of water and added dropwise to the casting solution. In the following formula, the base-catalyzed condensation operation is illustrated for A=Si in the $(-A-O-)_x$ repeat unit:

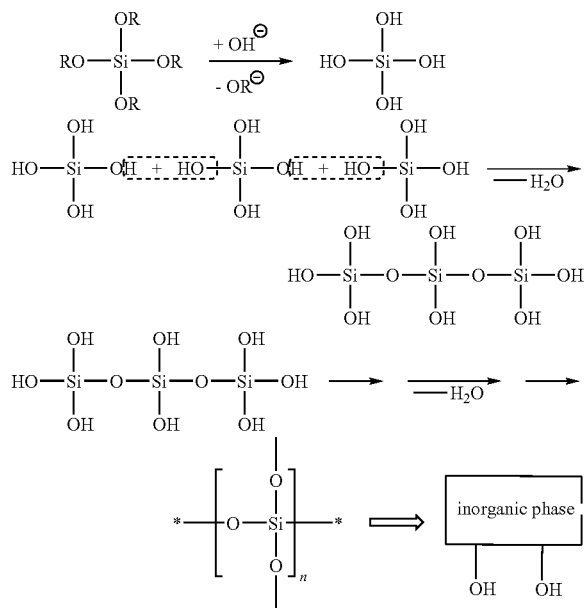

In a further preferred embodiment of the inventive method, at least one other additive is added to the membrane casting solution in step A) for further improvement of the practical properties of the inventive hybrid membrane. This at least one additive is preferably obtained from the following substance classes: oxo acid derivatives of the main and subgroup elements with tungsten, silicon, antimony, phosphorus, tantalum, niobium, titanium, sulfur, arsenic, bismuth, selenium, germanium, tin, lead, boron, chromium and/or molybdenum as the central atom, preferably $H_3PW_{12}O_{40} \times nH_2O$ (n=21 to 29), $H_3SiW_{12}O_{40} \times nH_2O$ (n=21 to 29), $H_xWO_3$ (x=0.3 to 1), $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ and/or $M_xO_y$, oxides with x=1 to 2 and y=2 to 5 with M=Al, Sb, Th, Sn, Zr, Mo and/or layered, banded and/or skeletal silicates, preferably zeolites, H-natrolites, H-mordenites, H-montmorillonites, ammonium analcines, ammonium sodalites, ammonium gallates. In the M(OR)Y group, boric acid triphenyl esters, boric acid triethyl esters, titanium(IV) ethylate, zirconium(IV) ethylate, aluminum triethylate are particularly preferred in the inventive method. In the $R_nXO_m$ group, bis(2-ethylhexyl)phosphate, diphenyl phosphate, phosphoric acid tritolyl esters, phosphoric acid tris-(triethylsilyl esters), phosphoric acid tris-(trimethylsilyl esters) and triphenyl phosphate are used particularly preferably.

Preferably the at least one additive is added in proportions of 1 to 20 wt % relative to the organic polymer, preferably to the membrane solution of step A), particularly preferably before addition of the basic catalyst.

Because of the diluting effect of the liquid precursor monomers, especially of the silicate monomers, or of the solutions thereof, the dynamic viscosity of the membrane casting solution in step A) is lowered to 20 to 200 dPas. This viscosity drop permits higher polyazole solid contents of at least 14 to 15 wt % and thinner wet layer thicknesses of less than 300 μm. Thus a greater membrane area can be produced per unit time from inventive membrane casting solutions. In contrast, polyazole solid contents of only 11 to 12 wt % with wet layer thicknesses of approximately 350 μm are possible in comparison membrane casting solutions without precursor monomers, especially without silicate monomers, and this has disadvantages for industrial processes.

In step C) of the inventive method there are produced hybrid membranes with dry thicknesses of 20 to 60 μm, preferably 20 to 45 μm, which membranes can be rolled up for further processing after passing through step C).

In a further configuration of the inventive method, the hybrid membrane is loaded with doping agents in a further step D) in order to impart proton conductivity.

When the inventive doped hybrid membranes have been doped with at least 85 wt % phosphoric acid, they exhibit greater mechanical strength in comparison with doped membranes without the addition of additive and without inorganic polymer. Inventive doped hybrid membranes in which at least one inorganic polymer is of silicate type tear only at tensile stresses of 5 $N/mm^2$ and an elongation of 84%, whereas the values for the doped comparison membrane are only 3 $N/mm^2$ and 23%.

The hybrid membranes produced according to the inventive method described in the foregoing are eminently suitable for the production of membrane electrode units (MEU) and high-temperature fuel cells. Such an inventive fuel cell is composed of at least one MEU, which is assembled from two flat gas-distribution electrodes and an inventive hybrid membrane sandwiched between them. The hybrid membrane is loaded with a doping agent to impart high protein conductivity. This doping agent is preferably phosphoric acid and is largely fixed. As an example, the hybrid membrane can be doped by placing the inventive hybrid membranes in phosphoric acid. Bonding of the inventive hybrid membrane to the phosphoric acid-impregnated gas-distribution electrodes in a manner that allows proton conduction is preferably achieved by the hot-pressing method under the influence of pressure and temperature.

The OH groups of the phosphoric acid interact to form hydrogen-bridge bonds with the imidazole groups of the polyazole. Furthermore, silanol groups of the inorganic polymer can condense to bind phosphoric acid covalently as phosphoric acid ester according to the following formula.

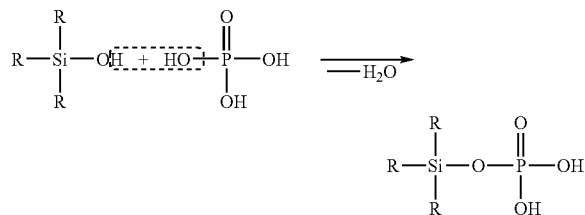

The strong binding force of the inventive hybrid membrane for phosphoric acid permits degrees of doping up to 90 wt %. It also opposes aging of the membrane during fuel-cell operation by preventing leaching of phosphoric acid with the product water. In fuel-cell operation, such hybrid membranes exhibit conductivities of at least 2 S/m at 24° C. and conductivities of at least 10 S/m at 160° C. In a preferred embodiment, an inventive hybrid membrane has a conductivity of at least 4 S/m at 24° C.

The inventive fuel cell can be operated in hydrogen/air mode within an operating temperature range of at least up to 250° C.

The invention will be described in more detail on the basis of FIGS. 1 and 2 and of exemplary embodiments 1 to 7.

BRIEF OF THE DESCRIPTION OF DRAWINGS

Figure 2:
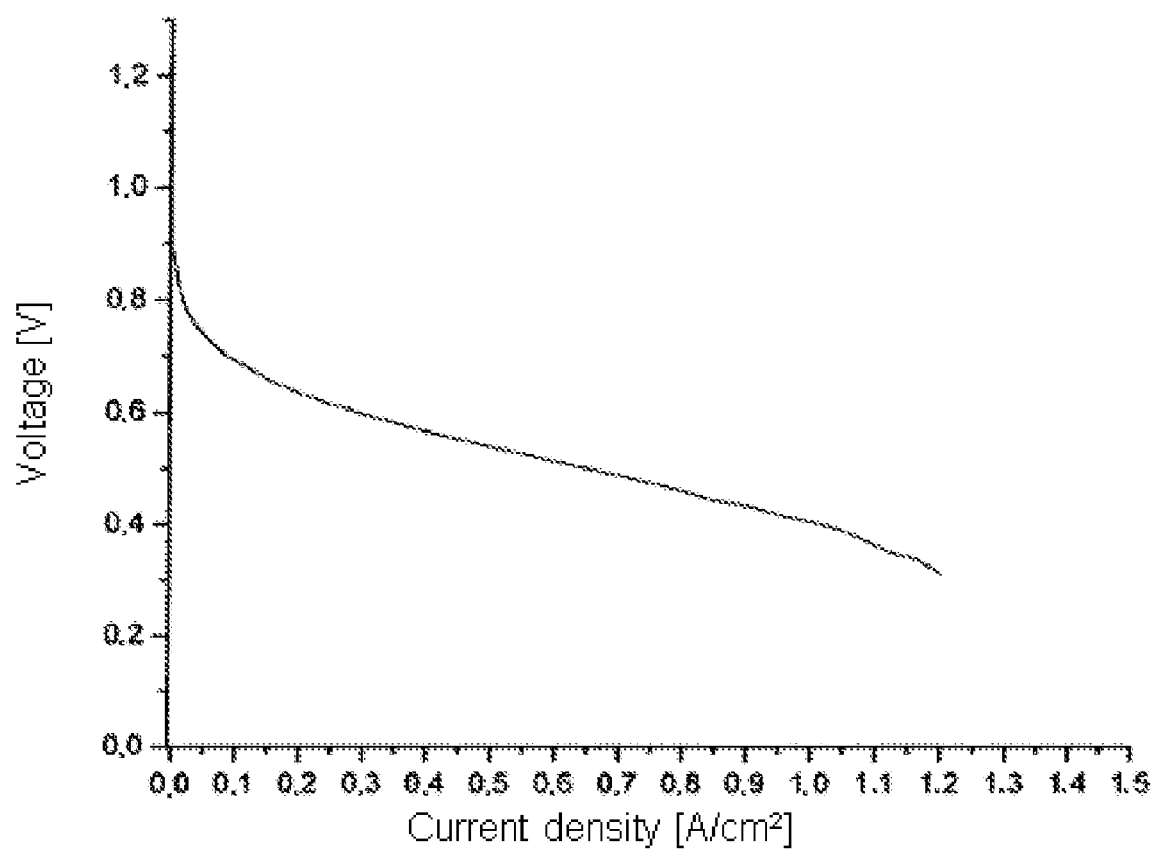

FIG. 1 shows a current-voltage characteristic of an inventive fuel cell at 160° C. and 3 bar in hydrogen/air mode, and FIG. 2 shows a current-voltage characteristic of a fuel cell with a comparison membrane at 160° C. and 3 bar in hydrogen/air mode.

DETAILED DESCRIPTION OF INVENTION

EXAMPLE 1

Production of a Hybrid Membrane 527 g of tetraethoxysilane (Wacker Co.) and 59 g of 3-(glycidoxypropyl)trimethoxysilane (Alfa Aesar Co.) are dissolved in 600 g of N,N-dimethylacetamide and, over a period of 70 minutes, using a dropping funnel, are added dropwise with stirring to 586 g of a solution of PBI (characterized by the fact that the inherent viscosity of 1% PBI solution is 1.09 dL/g) in 2847 g of N,N-dimethylacetamide. After addition of 5.9 g of potassium hydroxide dissolved in 10 mL of water, the mixture is stirred for 30 minutes at room temperature, filtered through a PP2 Sartopur® P8 capsule (20 μm) of Sartorius AG and then degassed for 19 hours at room temperature and 100 mbar. The casting solution is applied in a layer thickness of 280 μm and dried at 65° C. for 10 minutes. The hybrid membrane is separated from the backing film and further dried for 6 minutes at 190° C. followed by 4 hours at 250° C. The composition and properties of the membrane casting solution (Example 1) are presented in Table 1. The comparison membrane ("comparison example") was produced according to the same method.

TABLE 1

| No. | TEOS (wt %) | GPTMS (wt %) | PBI (wt %) | Wet thickness (μm) |
|---|---|---|---|---|
| Comparison example | — | — | 100 | 350 |
| Example 1 | 45 | 5 | 50 | 280 |

TEOS = tetraethoxysilane, GPTMS = (3-glycidoxypropyl)trimethoxysilane, PBI = polybenzimidazole

EXAMPLE 2

Determination of the Solubility

The solubility of a membrane produced according to Example 1 is determined by extraction. A sample comprising a piece of polymer membrane with 7.7 cm×7.7 cm edge length is punched out, weighed and placed in a round-bottomed flask. Sufficient N,N-dimethylacetamide to cover the piece of polymer completely with liquid is introduced into the round-bottomed flask. The round-bottomed flask is heated to 130° C. by means of an oil bath. After one hour of heating at 130° C. followed by cooling to room temperature, the solvent is filtered off and the sample is dried overnight at 200° C. After drying, the sample is placed in a desiccator filled with drying pellets, cooled to room temperature and evacuated to 100 mbar. The insoluble fraction of the sample is determined gravimetrically. The insoluble fraction is larger than 55%. A solubility of 45% is determined for the comparison membrane. The results are summarized in Table 2.

TABLE 2

| No. | Extraction (%) | Thickness (μm) | TS (N/mm$^2$) (elongation %) | E-modulus (N/mm$^2$) |
|---|---|---|---|---|
| Comparison example | 45 | 35 | 141 (4.9) | 5500 |
| Example 1 | 100 | 40 | 166 (7.5) | 5600 |

TS = maximal tensile stress, E-modulus = modulus of elasticity

EXAMPLE 3

Tensile Stress Measurements

The mechanical stability of the membrane is evaluated by carrying out tensile stress measurements. Membrane samples with a length of 10 cm and a width of 2 cm are clamped in a Z 2.5 testing machine of Zwick GmbH & Co. and subjected to a tensile stress test at room temperature and a speed of 5 mm/min. An undoped hybrid membrane produced according to Example 1 has a modulus of elasticity of 5600 N/mm$^2$ and higher and, compared with the comparison membrane, tears at tensile stresses above 160 N/mm$^2$ and an elongation of >7%. The comparison membrane has a modulus of elasticity of 5500 N/mm$^2$ and already tears at tensile stresses of 141 N/mm$^2$ and elongations of only approximately 5%. The results are summarized in Table 2.

EXAMPLE 4

Doping with Phosphoric Acid

To evaluate the absorption capacity for doping agents, membrane samples measuring 11.8 cm×13.5 cm are placed in 85 weight percent phosphoric acid at 130° C. for 30 minutes.

The adhering phosphoric acid is wiped off and then the weight gain is determined gravimetrically according to the following formula:

((doped weight−weight before doping)/doped weight)×100=degree of doping (%)

Compared with a comparison membrane, hybrid membranes absorb more than 85% phosphoric acid. Despite the higher degree of doping, doped membranes tear only at tensile stresses of 5 N/mm² and an elongation of 84%. The results are summarized in Table 3.

TABLE 3

| No. | Degree of doping (%) | TS (N/mm²) (elongation %) | E-modulus (N/mm²) | Conductivity (24° C.) (S/m) | $P_{0.6\,V}$ (W/cm²) ($U_0$ (V)) |
|---|---|---|---|---|---|
| Ref. | 81 | 3 (23) | 58 | 3.2 | 0.18 (0.88) |
| Ex. 1 | 87 | 5 (84) | 24 | 4.3 | 0.30 (1.02) |

Degree of doping = weight gain from 85 weight percent phosphoric acid at 130° C., TS = maximal tensile stress, E-modulus = modulus of elasticity, $P_{0.6\,V}$ = power at 0.6 V, $U_0$ = open-circuit voltage

EXAMPLE 5

Measurement of Proton Conductivity

To evaluate the proton conductivity, the doped hybrid membranes are cut into pieces measuring 4.5 cm×2 cm, measured at 3 points at least to determine the average thickness and installed in a test cell. The test cell is composed of 4 electrodes, and the resistance is measured by impedance spectroscopy at room temperature and with exclusion of atmospheric moisture. Compared with the comparison membrane, which has a conductivity of 3.2 S/m, doped hybrid membranes exhibit a conductivity of greater than 4 S/m at 24° C. (Table 3).

EXAMPLE 6

Production of a Fuel Cell

The membranes produced according to Example 1 are cut into large square pieces measuring 104 cm² and combined with commercially available ELAT electrodes of the E-TEK Co. having 2.0 mg/cm² Pt loading and an area of 50 cm², which electrodes are each impregnated with 0.27 g of phosphoric acid. The membrane-electrode sandwich is compressed into membrane-electrode units between plane-parallel platens for 4 hours at 160° C. and 50 bar. The membrane electrode units obtained in this way are installed in a standard arrangement in the test fuel cell of Fuel Cell Technologies, Inc. and sealed with a compression pressure of 15 bar.

EXAMPLE 7

Determination of the Performance Parameters of the Fuel Cells According to Example 6

The cells according to Example 6 are connected to an FCATS Advanced Screener, which is a fuel-cell test bench commercially available from Hydrogenics, Inc., and are operated by charging with air and hydrogen at 160° C. and 3 bar absolute. The hydrogen gas flow was 783 smL/min and the air gas flow was 2486 smL/min. FIG. 1 shows the shape of the current-voltage characteristic for the hybrid membrane at 160° C. and 3 bar. FIG. 2 shows the current-voltage characteristic for the comparison membrane under analogous operating conditions. The characteristics were recorded with dry gases.

The invention claimed is:

1. A hybrid membrane for use in polymer electrolyte membrane fuel cells, composed of at least one basic organic polymer and at least one inorganic polymer, which are intimately mixed at the molecular level, wherein the inorganic polymer is formed from at least two precursor monomers in the presence of a catalyst during membrane formation,
wherein an interaction in the form of covalent bonds takes place between the polymers,
wherein a first precursor monomer comprises the general formula:

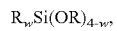

where
w=0 to 3,
R=$C_1$-$C_{15}$ alkyl group, $C_5$-$C_{20}$ aryl or heteroaryl group
and wherein a second precursor monomer comprises the general formula

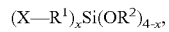

where
x=1 to 3,
$R^1$=—$(CH_2)_y$— or —$CH_2O(CH_2)_y$— with y=1 to 5, or $C_5$-$C_{20}$ aryl or heteroaryl group,
$R^2$=$C_1$-$C_{15}$ alkyl group or $C_5$-$C_{20}$ aryl or heteroaryl group, and
X=epoxy, isocyanato, anhydrido, or methacryloxy.

2. A hybrid membrane according to claim 1, in which the at least one basic organic polymer is a polymer selected from the group comprising polybenzimidazoles, polypyridines, polypyrimidines, polyimidazoles, polybenzthiazoles, polybenzoxazoles, polyoxadiazoles, polyquinoxalines, polythiadiazoles and/or poly(tetrazapyrenes).

3. A hybrid membrane according to claim 2, wherein the at least one organic polymer from the group of polybenzimidazoles is poly(2,2'-(m-phenylene)-5,5'-dibenzimidazole) and/or poly-2,5-benzimidazole.

4. A hybrid membrane according to claim 3, wherein a 1 weight per cent solution of poly(2,2'-(m-phenylene)-5,5'-dibenzimidazole) in N,N-dimethylacetamide has an inherent viscosity of at least 0.85 dl/g.

5. A hybrid membrane according to claim 3, wherein a 1 weight per cent solution of poly-2,5-benzimidazole in ethanol containing 3 wt % of sodium hydroxide has an inherent viscosity of at least 1.5 dl/g.

6. A hybrid membrane according to claim 1, wherein the at least one inorganic polymer constitutes reinforcement for the at least one organic polymer.

7. A hybrid membrane according to claim 1, in which the inorganic polymer is a silicate polymer.

8. A hybrid membrane according to claim 1, which contains at least one additive from the substance group of oxo acid derivatives of the main and subgroup elements with tungsten, silicon, antimony, phosphorus, tantalum, niobium, titanium, sulfur, arsenic, bismuth, selenium, germanium, tin, lead, boron, chromium and/or molybdenum as the central atom and/or from the substance group of the $M_xO_y$ oxides with x=1 to 2 and y=2 to 5 with M=Al, Sb, Th, Sn, Zr, Mo and/or from the groups of layered, banded and/or skeletal silicates.

9. A hybrid membrane according to claim 8, wherein the proportion of the additive is 1 to 20% relative to the organic polymer.

10. A hybrid membrane according to claim 8, wherein the hybrid membranes fix a doping agent in order to achieve proton conductivity.

11. A hybrid membrane according to claim 10, which contains phosphoric acid as the doping agent.

12. A hybrid membrane according to claim 10, which exhibit a conductivity of at least 4 S/m at 24° C.

13. A hybrid membrane according to claim 8 where the group of layered, banded and/or skeletal silicates, is selected from zeolites, H-natrolites, H-mordenites, H-montmorillonites, ammonium analcines, ammonium sodalites, ammonium gallates.

14. The hybrid membrane of claim 1, wherein the inorganic polymer is further formed in the presence of a third precursor molecule,
wherein the third precursor monomer comprises the general formula $$(X—R^1)_x Si(OR^2)_{4-x},$$

where
x=1 to 3,
$R^1$=—(CH$_2$)$_y$— or —CH$_2$O(CH$_2$)$_y$— with y=1 to 5, or $C_5$-$C_{20}$ aryl or heteroaryl group,
$R^2$=$C_1$-$C_{15}$ alkyl group or $C_5$-$C_{20}$ aryl or heteroaryl group,
X=hydroxyl, amino, vinyl or
—CO$_2$Z, —PO$_3$Z$_2$, —SO$_3$Z with
Z=hydrogen, alkali metal cation (Li, Na, K, Cs), $C_1$-$C_{15}$ alkyl group, $C_1$-$C_{15}$ alkoxy group, $C_5$-$C_{20}$ aryl or heteroaryl group, SiR$^3_3$ with
$R^3$=$C_1$-$C_{15}$ alkyl group, $C_5$-$C_{20}$ aryl or heteroaryl group, $C_1$-$C_{15}$ alkoxy group or ethyleneoxy group, in which the foregoing Z and/or $R^3$ groups are substituted with halogen, OH, CN groups and/or $$(Het(C=O)—N(R^6)—R^5)_x Si(OR^4)_{4-x},$$

where
x=1 to 3,
$R^4$=$C_1$-$C_{15}$ alkyl group or $C_5$-$C_{20}$ aryl or heteroaryl group,
$R^5$=—(CH$_2$)$_y$ with y=1 to 5 or $C_5$-$C_{20}$ aryl or heteroaryl group,
$R^6$=hydrogen, $C_1$-$C_{15}$ alkyl group or $C_5$-$C_{20}$ aryl group and
Het=heteroaryl group with preferably nitrogen-containing aromatic heterocycles in the ring and/or alkoxy and aryloxy derivatives of the main and subgroup elements, optionally M(OR$^7$)$_y$ where
y=3 to 4,
M=inorganic central atom selected from B, Al, Ti, Zr,
$R^7$=$C_1$-$C_{15}$ alkyl group or $C_5$-$C_{20}$ aryl or heteroaryl group and/or alkyl and aryl derivatives of polybasic oxo acids of the formula $$R^8_n X O_m$$

where n>1,
m>2 with
m>n,
X=P, S, Se, Mo, W, As, Bi, Ge, Sn, Pb, Cr;
$R^8$=H, $C_1$-$C_{15}$ alkyl group or $C_5$-$C_{20}$ aryl or heteroaryl group or SiR$^9_3$ with
$R^9$=$C_1$-$C_{15}$ alkyl group or $C_5$-$C_{20}$ aryl or heteroaryl group.

15. The hybrid membrane of claim 1, wherein the catalyst is a basic catalyst.

16. The hybrid membrane of claim 1, wherein the second precursor monomer is:

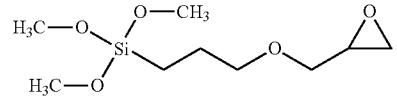

(3-glycidoxypropyl)trimethoxysilane.

17. A fuel cell, composed of at least one membrane-electrode unit, which is formed from two flat gas-distribution electrodes and a hybrid membrane according to claim 1 sandwiched between them, wherein the hybrid membrane fixes a doping agent in order to increase the proton conductivity of the hybrid membrane.

18. A fuel cell according to claim 17, wherein the doping agent is phosphoric acid.

19. A fuel cell according to claim 18, which can be operated in hydrogen/air mode in an operating temperature range up to 250° C.

* * * * *